US007046492B2

(12) United States Patent
Fromm et al.

(10) Patent No.: US 7,046,492 B2
(45) Date of Patent: May 16, 2006

(54) POWER TRANSFORMER/INDUCTOR

(75) Inventors: Udo Fromm, Vasteras (SE); Sven Hornfeldt, Vasteras (SE); Par Holmberg, Vasteras (SE); Gunnar Kylander, Vasteras (SE); Li Ming, Vasteras (SE); Mats Leijon, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 11/014,804

(22) Filed: Dec. 20, 2004

(65) Prior Publication Data

US 2005/0099258 A1 May 12, 2005

Related U.S. Application Data

(63) Continuation of application No. 09/355,795, filed on Oct. 22, 1999.

(30) Foreign Application Priority Data

Feb. 3, 1997 (SE) .................................... 9700337
Nov. 28, 1997 (SE) .................................... 9704413

(51) Int. Cl.
*H02H 7/04* (2006.01)

(52) U.S. Cl. ................................ 361/38; 174/DIG. 13

(58) Field of Classification Search .................. 361/35, 361/38, 39, 40; 174/120, 50, 73, 1, DIG. 13, 174/DIG. 33; 336/175, 212, 182

See application file for complete search history.

(56) References Cited

U.S. PATENT DOCUMENTS

| | | | |
|---|---|---|---|
| 681,800 | A | 9/1901 | Lasche |
| 847,008 | A | 3/1907 | Kitsee |
| 1,304,451 | A | 5/1919 | Burnham |
| 1,418,856 | A | 6/1922 | Williamson |
| 1,481,585 | A | 1/1924 | Beard |
| 1,508,456 | A | 9/1924 | Lenz |
| 1,728,915 | A | 9/1929 | Blankenship et al. |
| 1,742,985 | A | 1/1930 | Burnham |
| 1,747,507 | A | 2/1930 | George |
| 1,756,672 | A | 4/1930 | Barr |

(Continued)

FOREIGN PATENT DOCUMENTS

| | | |
|---|---|---|
| AT | 399790 | 7/1995 |

(Continued)

OTHER PUBLICATIONS

A test installation of a self-tuned ac filter in the Konti-Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64-70.

(Continued)

*Primary Examiner*—Ronald Leja
(74) *Attorney, Agent, or Firm*—Oblon, Spivak, McClelland, Maier & Neustadt, P.C.

(57) ABSTRACT

A power transformer/inductor includes at least one winding. The winding is made of a high voltage cable that includes an electric conductor, and around the electric conductor is arranged a first semiconducting layer, around the first semiconducting layer is an insulating layer, and around the insulating layer is a second semiconducting layer. The second semiconducting layer is directly earthed at both ends of the winding and furthermore at least at two points per turn of every winding such that one or more points are indirectly earthed.

9 Claims, 6 Drawing Sheets

U.S. PATENT DOCUMENTS

| | | | |
|---|---|---|---|
| 1,762,775 | A | 6/1930 | Ganz |
| 1,781,308 | A | 11/1930 | Vos |
| 1,861,182 | A | 5/1932 | Hendey et al. |
| 1,904,885 | A | 4/1933 | Seeley |
| 1,974,406 | A | 9/1934 | Apple et al. |
| 2,006,170 | A | 6/1935 | Juhlin |
| 2,206,856 | A | 7/1940 | Shearer |
| 2,217,430 | A | 10/1940 | Baudry |
| 2,241,832 | A | 5/1941 | Wahlquist |
| 2,251,291 | A | 8/1941 | Reichelt |
| 2,256,897 | A | 9/1941 | Davidson et al. |
| 2,295,415 | A | 9/1942 | Monroe |
| 2,409,893 | A | 10/1946 | Pendleton et al. |
| 2,415,652 | A | 2/1947 | Norton |
| 2,424,443 | A | 7/1947 | Evans |
| 2,436,306 | A | 2/1948 | Johnson |
| 2,446,999 | A | 8/1948 | Camilli |
| 2,459,322 | A | 1/1949 | Johnston |
| 2,462,651 | A | 2/1949 | Lord |
| 2,498,238 | A | 2/1950 | Berberich et al. |
| 2,650,350 | A | 8/1953 | Heath |
| 2,703,852 | A | 3/1955 | Meador |
| 2,721,905 | A | 10/1955 | Monroe |
| 2,749,456 | A | 6/1956 | Luenberger |
| 2,780,771 | A | 2/1957 | Lee |
| 2,846,599 | A | 8/1958 | McAdam |
| 2,885,581 | A | 5/1959 | Pileggi |
| 2,943,242 | A | 6/1960 | Schaschl et al. |
| 2,947,957 | A | 8/1960 | Spindler |
| 2,959,699 | A | 11/1960 | Smith et al. |
| 2,962,679 | A | 11/1960 | Stratton |
| 2,975,309 | A | 3/1961 | Seidner |
| 3,014,139 | A | 12/1961 | Shildneck |
| 3,098,893 | A | 7/1963 | Pringle et al. |
| 3,130,335 | A | 4/1964 | Rejda |
| 3,143,269 | A | 8/1964 | Van Eldik |
| 3,157,806 | A | 11/1964 | Wiedemann |
| 3,158,770 | A | 11/1964 | Coggeshall et al. |
| 3,197,723 | A | 7/1965 | Dortort |
| 3,268,766 | A | 8/1966 | Amos |
| 3,304,599 | A | 2/1967 | Nordin |
| 3,354,331 | A | 11/1967 | Broeker et al. |
| 3,365,657 | A | 1/1968 | Webb |
| 3,372,283 | A | 3/1968 | Jaecklin |
| 3,392,779 | A | 7/1968 | Tilbrook |
| 3,411,027 | A | 11/1968 | Rosenberg |
| 3,418,530 | A | 12/1968 | Cheever |
| 3,435,262 | A | 3/1969 | Bennett et al. |
| 3,437,858 | A | 4/1969 | White |
| 3,444,407 | A | 5/1969 | Yates |
| 3,447,002 | A | 5/1969 | Ronnevig |
| 3,484,690 | A | 12/1969 | Wald |
| 3,541,221 | A | 11/1970 | Aupoix et al. |
| 3,560,777 | A | 2/1971 | Moeller |
| 3,571,690 | A | 3/1971 | Lataisa |
| 3,593,123 | A | 7/1971 | Williamson |
| 3,631,519 | A | 12/1971 | Salahshourian |
| 3,644,662 | A | 2/1972 | Salahshourian |
| 3,651,244 | A | 3/1972 | Silver et al. |
| 3,651,402 | A | 3/1972 | Leffmann |
| 3,660,721 | A | 5/1972 | Baird |
| 3,666,876 | A | 5/1972 | Forster |
| 3,670,192 | A | 6/1972 | Andersson et al. |
| 3,675,056 | A | 7/1972 | Lenz |
| 3,684,821 | A | 8/1972 | Miyauchi et al. |
| 3,684,906 | A | 8/1972 | Lexz |
| 3,699,238 | A | 10/1972 | Hansen et al. |
| 3,716,652 | A | 2/1973 | Lusk et al. |
| 3,716,719 | A | 2/1973 | Angelery et al. |
| 3,727,085 | A | 4/1973 | Goetz et al. |
| 3,740,600 | A | 6/1973 | Turley |
| 3,743,867 | A | 7/1973 | Smith, Jr. |
| 3,746,954 | A | 7/1973 | Myles et al. |
| 3,758,699 | A | 9/1973 | Lusk et al. |
| 3,778,891 | A | 12/1973 | Amasino et al. |
| 3,781,739 | A | 12/1973 | Meyer |
| 3,787,607 | A | 1/1974 | Schlafly |
| 3,792,399 | A | 2/1974 | McLyman |
| 3,801,843 | A | 4/1974 | Corman et al. |
| 3,809,933 | A | 5/1974 | Sugawara et al. |
| 3,813,764 | A | 6/1974 | Tanaka et al. |
| 3,820,048 | A | 6/1974 | Ohta et al. |
| 3,828,115 | A | 8/1974 | Hvizd, Jr. |
| 3,881,647 | A | 5/1975 | Wolfe |
| 3,884,154 | A | 5/1975 | Marten |
| 3,891,880 | A | 6/1975 | Britsch |
| 3,902,000 | A | 8/1975 | Forsyth et al. |
| 3,912,957 | A | 10/1975 | Reynolds |
| 3,932,779 | A | 1/1976 | Madsen |
| 3,932,791 | A | 1/1976 | Oswald |
| 3,943,392 | A | 3/1976 | Keuper et al. |
| 3,947,278 | A | 3/1976 | Youtsey |
| 3,965,408 | A | 6/1976 | Higuchi et al. |
| 3,968,388 | A | 7/1976 | Lambrecht et al. |
| 3,971,543 | A | 7/1976 | Shanahan |
| 3,974,314 | A | 8/1976 | Fuchs |
| 3,993,860 | A | 11/1976 | Snow et al. |
| 3,995,785 | A | 12/1976 | Arick et al. |
| 4,001,616 | A | 1/1977 | Lonseth et al. |
| 4,008,367 | A | 2/1977 | Sunderhauf |
| 4,008,409 | A | 2/1977 | Rhudy et al. |
| 4,031,310 | A | 6/1977 | Jachimowicz |
| 4,039,740 | A | 8/1977 | Iwata |
| 4,041,431 | A | 8/1977 | Enoksen |
| 4,047,138 | A | 9/1977 | Steigerwald |
| 4,064,419 | A | 12/1977 | Peterson |
| 4,084,307 | A | 4/1978 | Schultz et al. |
| 4,085,347 | A | 4/1978 | Lichius |
| 4,088,953 | A | 5/1978 | Sarian |
| 4,091,138 | A | 5/1978 | Takagi et al. |
| 4,091,139 | A | 5/1978 | Quirk |
| 4,099,227 | A | 7/1978 | Liptak |
| 4,103,075 | A | 7/1978 | Adam |
| 4,106,069 | A | 8/1978 | Trautner et al. |
| 4,107,092 | A | 8/1978 | Carnahan et al. |
| 4,109,098 | A | 8/1978 | Olsson et al. |
| 4,121,148 | A | 10/1978 | Platzer |
| 4,132,914 | A | 1/1979 | Khutoretsky et al. |
| 4,134,036 | A | 1/1979 | Curtiss |
| 4,134,055 | A | 1/1979 | Akamatsu |
| 4,134,146 | A | 1/1979 | Stetson |
| 4,149,101 | A | 4/1979 | Lesokhin et al. |
| 4,152,615 | A | 5/1979 | Calfo et al. |
| 4,160,193 | A | 7/1979 | Richmond |
| 4,164,672 | A | 8/1979 | Flick |
| 4,164,772 | A | 8/1979 | Hingorani |
| 4,177,397 | A | 12/1979 | Lill |
| 4,177,418 | A | 12/1979 | Brueckner et al. |
| 4,184,186 | A | 1/1980 | Barkan |
| 4,198,613 | A | 4/1980 | Whitley |
| 4,200,817 | A | 4/1980 | Bratoljic |
| 4,200,818 | A | 4/1980 | Ruffing et al. |
| 4,206,434 | A | 6/1980 | Hase |
| 4,207,427 | A | 6/1980 | Beretta et al. |
| 4,207,482 | A | 6/1980 | Neumeyer et al. |
| 4,208,597 | A | 6/1980 | Mulach et al. |
| 4,229,721 | A | 10/1980 | Koloczek et al. |
| 4,238,339 | A | 12/1980 | Khutoretsky et al. |
| 4,239,999 | A | 12/1980 | Vinokurov et al. |
| 4,245,182 | A | 1/1981 | Aotsu et al. |
| 4,246,694 | A | 1/1981 | Raschbichler et al. |
| 4,255,684 | A | 3/1981 | Mischler et al. |
| 4,258,280 | A | 3/1981 | Starcevic |
| 4,262,209 | A | 4/1981 | Berner |

| | | | |
|---|---|---|---|
| 4,274,027 | A | 6/1981 | Higuchi et al. |
| 4,281,264 | A | 7/1981 | Keim et al. |
| 4,292,558 | A | 9/1981 | Flick et al. |
| 4,307,311 | A | 12/1981 | Grozinger |
| 4,308,476 | A | 12/1981 | Schuler |
| 4,308,575 | A | 12/1981 | Mase |
| 4,310,966 | A | 1/1982 | Breitenbach |
| 4,314,168 | A | 2/1982 | Breitenbach |
| 4,317,001 | A | 2/1982 | Silver et al. |
| 4,320,645 | A | 3/1982 | Stanley |
| 4,321,426 | A | 3/1982 | Schaeffer et al. |
| 4,321,518 | A | 3/1982 | Akamatsu |
| 4,326,181 | A | 4/1982 | Allen |
| 4,330,726 | A | 5/1982 | Albright et al. |
| 4,337,922 | A | 7/1982 | Streiff et al. |
| 4,341,989 | A | 7/1982 | Sandberg et al. |
| 4,347,449 | A | 8/1982 | Beau |
| 4,347,454 | A | 8/1982 | Gellert et al. |
| 4,353,612 | A | 10/1982 | Meyers |
| 4,357,542 | A | 11/1982 | Kirschbaum |
| 4,360,748 | A | 11/1982 | Raschbichler et al. |
| 4,361,723 | A | 11/1982 | Hvizd, Jr. et al. |
| 4,365,178 | A | 12/1982 | Lexz |
| 4,367,425 | A | 1/1983 | Mendelsohn et al. |
| 4,367,890 | A | 1/1983 | Spirk |
| 4,368,418 | A | 1/1983 | Demello et al. |
| 4,369,389 | A | 1/1983 | Lambrecht |
| 4,371,745 | A | 2/1983 | Sakashita |
| 4,384,944 | A | 5/1983 | Silver et al. |
| 4,387,316 | A | 6/1983 | Katsekas |
| 4,390,919 | A | 6/1983 | Lesinski |
| 4,401,920 | A | 8/1983 | Taylor et al. |
| 4,403,163 | A | 9/1983 | Rarmerding et al. |
| 4,404,486 | A | 9/1983 | Keim et al. |
| 4,411,710 | A | 10/1983 | Mochizuki et al. |
| 4,421,284 | A | 12/1983 | Pan |
| 4,425,521 | A | 1/1984 | Rosenberry, Jr. et al. |
| 4,426,771 | A | 1/1984 | Wang et al. |
| 4,429,244 | A | 1/1984 | Nikiten et al. |
| 4,431,960 | A | 2/1984 | Zucker |
| 4,432,029 | A | 2/1984 | Lundqvist |
| 4,437,464 | A | 3/1984 | Crow |
| 4,443,725 | A | 4/1984 | Derderian et al. |
| 4,470,884 | A | 9/1984 | Carr |
| 4,473,765 | A | 9/1984 | Butman, Jr. et al. |
| 4,475,075 | A | 10/1984 | Munn |
| 4,477,690 | A | 10/1984 | Nikitin et al. |
| 4,481,438 | A | 11/1984 | Keim |
| 4,484,106 | A | 11/1984 | Taylor et al. |
| 4,488,079 | A | 12/1984 | Dailey et al. |
| 4,490,651 | A | 12/1984 | Taylor et al. |
| 4,503,284 | A | 3/1985 | Minnick et al. |
| 4,508,251 | A | 4/1985 | Harada et al. |
| 4,510,077 | A | 4/1985 | Elton |
| 4,517,471 | A | 5/1985 | Sachs |
| 4,520,287 | A | 5/1985 | Wang et al. |
| 4,523,249 | A | 6/1985 | Arimoto |
| 4,538,131 | A | 8/1985 | Baier et al. |
| 4,546,210 | A | 10/1985 | Akiba et al. |
| 4,551,780 | A | 11/1985 | Canay |
| 4,552,990 | A | 11/1985 | Persson et al. |
| 4,557,038 | A | 12/1985 | Wcislo et al. |
| 4,560,896 | A | 12/1985 | Vogt et al. |
| 4,565,929 | A | 1/1986 | Baskin et al. |
| 4,571,453 | A | 2/1986 | Takaoka et al. |
| 4,575,691 | A | 3/1986 | Capek et al. |
| 4,588,916 | A | 5/1986 | Lis |
| 4,590,416 | A | 5/1986 | Porche et al. |
| 4,594,630 | A | 6/1986 | Rabinowitz et al. |
| 4,607,183 | A | 8/1986 | Rieber et al. |
| 4,615,109 | A | 10/1986 | Wcislo et al. |
| 4,615,778 | A | 10/1986 | Elton |
| 4,618,795 | A | 10/1986 | Cooper et al. |
| 4,619,040 | A | 10/1986 | Wang et al. |
| 4,622,116 | A | 11/1986 | Elton et al. |
| 4,633,109 | A | 12/1986 | Feigel |
| 4,650,924 | A | 3/1987 | Kauffman et al. |
| 4,652,963 | A | 3/1987 | Fahlen |
| 4,656,316 | A | 4/1987 | Meltsch |
| 4,656,379 | A | 4/1987 | McCarty |
| 4,663,603 | A | 5/1987 | van Riemsdijk et al. |
| 4,677,328 | A | 6/1987 | Kumakura |
| 4,687,882 | A | 8/1987 | Stone et al. |
| 4,692,731 | A | 9/1987 | Osinga |
| 4,723,083 | A | 2/1988 | Elton |
| 4,723,104 | A | 2/1988 | Rohatyn |
| 4,724,345 | A | 2/1988 | Elton et al. |
| 4,732,412 | A | 3/1988 | van der Linden et al. |
| 4,737,704 | A | 4/1988 | Kalinnikov et al. |
| 4,745,314 | A | 5/1988 | Nakano |
| 4,761,602 | A | 8/1988 | Leibovich |
| 4,766,365 | A | 8/1988 | Bolduc et al. |
| 4,771,168 | A | 9/1988 | Gundersen et al. |
| 4,785,138 | A | 11/1988 | Breitenbach et al. |
| 4,795,933 | A | 1/1989 | Sakai |
| 4,823,095 | A | 4/1989 | Atallah et al. |
| 4,827,172 | A | 5/1989 | Kobayashi |
| 4,845,308 | A | 7/1989 | Womack, Jr. et al. |
| 4,847,747 | A | 7/1989 | Abbondanti |
| 4,853,565 | A | 8/1989 | Elton et al. |
| 4,859,810 | A | 8/1989 | Cloetens et al. |
| 4,859,989 | A | 8/1989 | McPherson |
| 4,860,430 | A | 8/1989 | Raschbichler et al. |
| 4,864,266 | A | 9/1989 | Feather et al. |
| 4,883,230 | A | 11/1989 | Lindstrom |
| 4,890,040 | A | 12/1989 | Gundersen |
| 4,894,284 | A | 1/1990 | Yamanouchi et al. |
| 4,914,386 | A | 4/1990 | Zocholl |
| 4,918,347 | A | 4/1990 | Takaba |
| 4,918,835 | A | 4/1990 | Raschbichler et al. |
| 4,924,342 | A | 5/1990 | Lee |
| 4,926,079 | A | 5/1990 | Niemela et al. |
| 4,942,326 | A | 7/1990 | Butler, III et al. |
| 4,949,001 | A | 8/1990 | Campbell |
| 4,982,147 | A | 1/1991 | Lauw |
| 4,994,952 | A | 2/1991 | Silva et al. |
| 4,997,995 | A | 3/1991 | Simmons et al. |
| 5,012,125 | A | 4/1991 | Conway |
| 5,030,813 | A | 7/1991 | Stanisz |
| 5,036,165 | A | 7/1991 | Elton et al. |
| 5,036,238 | A | 7/1991 | Tajima |
| 5,066,881 | A | 11/1991 | Elton et al. |
| 5,067,046 | A | 11/1991 | Elton et al. |
| 5,083,360 | A | 1/1992 | Valencic et al. |
| 5,086,246 | A | 2/1992 | Dymond et al. |
| 5,091,609 | A | 2/1992 | Sawada et al. |
| 5,094,703 | A | 3/1992 | Takaoka et al. |
| 5,095,175 | A | 3/1992 | Yoshida et al. |
| 5,097,241 | A | 3/1992 | Smith et al. |
| 5,097,591 | A | 3/1992 | Wcislo et al. |
| 5,111,095 | A | 5/1992 | Hendershot |
| 5,124,607 | A | 6/1992 | Rieber et al. |
| 5,136,459 | A | 8/1992 | Fararooy |
| 5,140,290 | A | 8/1992 | Dersch |
| 5,153,460 | A | 10/1992 | Bovino et al. |
| 5,168,662 | A | 12/1992 | Nakamura et al. |
| 5,171,941 | A | 12/1992 | Shimizu et al. |
| 5,175,396 | A | 12/1992 | Emery et al. |
| 5,182,537 | A | 1/1993 | Thuis |
| 5,187,428 | A | 2/1993 | Hutchison et al. |
| 5,218,507 | A | 6/1993 | Ashley |
| 5,231,249 | A | 7/1993 | Kimura et al. |
| 5,235,488 | A | 8/1993 | Koch |
| 5,246,783 | A | 9/1993 | Spenadel et al. |
| 5,264,778 | A | 11/1993 | Kimmel et al. |
| 5,287,262 | A | 2/1994 | Klein |

| | | | |
|---|---|---|---|
| 5,293,146 | A | 3/1994 | Aosaki et al. |
| 5,304,883 | A | 4/1994 | Denk |
| 5,305,961 | A | 4/1994 | Errard et al. |
| 5,321,308 | A | 6/1994 | Johncock |
| 5,323,330 | A | 6/1994 | Asplund et al. |
| 5,325,008 | A | 6/1994 | Grant |
| 5,325,259 | A | 6/1994 | Paulsson |
| 5,327,637 | A | 7/1994 | Breitenbach et al. |
| 5,341,281 | A | 8/1994 | Skibinski |
| 5,343,139 | A | 8/1994 | Gyugyi et al. |
| 5,355,046 | A | 10/1994 | Weigelt |
| 5,365,132 | A | 11/1994 | Hann et al. |
| 5,387,890 | A | 2/1995 | Estop et al. |
| 5,397,513 | A | 3/1995 | Steketee, Jr. |
| 5,399,941 | A | 3/1995 | Grothaus et al. |
| 5,400,005 | A | 3/1995 | Bobry |
| 5,408,169 | A | 4/1995 | Jeanneret |
| 5,449,861 | A | 9/1995 | Fujino et al. |
| 5,452,170 | A | 9/1995 | Ohde et al. |
| 5,468,916 | A | 11/1995 | Litenas et al. |
| 5,499,178 | A | 3/1996 | Mohan |
| 5,500,632 | A | 3/1996 | Halser, III |
| 5,510,942 | A | 4/1996 | Bock et al. |
| 5,530,307 | A | 6/1996 | Horst |
| 5,533,658 | A | 7/1996 | Benedict et al. |
| 5,534,754 | A | 7/1996 | Poumey |
| 5,545,853 | A | 8/1996 | Hildreth |
| 5,550,410 | A | 8/1996 | Titus |
| 5,583,387 | A | 12/1996 | Takeuchi et al. |
| 5,587,126 | A | 12/1996 | Steketee, Jr. |
| 5,598,137 | A | 1/1997 | Alber et al. |
| 5,607,320 | A | 3/1997 | Wright |
| 5,612,510 | A | 3/1997 | Hildreth |
| 5,663,605 | A | 9/1997 | Evans et al. |
| 5,672,926 | A | 9/1997 | Brandes et al. |
| 5,689,223 | A | 11/1997 | Demarmels et al. |
| 5,807,447 | A | 9/1998 | Forrest |
| 5,834,699 | A | 11/1998 | Buck et al. |

FOREIGN PATENT DOCUMENTS

| | | | |
|---|---|---|---|
| BE | 565063 | | 2/1957 |
| CH | 391071 | | 4/1965 |
| CH | SU 266037 | | 10/1965 |
| CH | 534448 | | 2/1973 |
| CH | 539328 | | 7/1973 |
| CH | SU 646403 | | 2/1979 |
| CH | 657482 | | 8/1986 |
| CH | SU 1189322 | | 10/1986 |
| DE | 40414 | | 8/1887 |
| DE | 277012 | | 7/1914 |
| DE | 336418 | | 6/1920 |
| DE | 372390 | | 3/1923 |
| DE | 386561 | | 12/1923 |
| DE | 387973 | | 1/1924 |
| DE | 406371 | | 11/1924 |
| DE | 425551 | | 2/1926 |
| DE | 426793 | | 3/1926 |
| DE | 432169 | | 7/1926 |
| DE | 433749 | | 9/1926 |
| DE | 435608 | | 10/1926 |
| DE | 435609 | | 10/1926 |
| DE | 441717 | | 3/1927 |
| DE | 443011 | | 4/1927 |
| DE | 460124 | | 5/1928 |
| DE | 482506 | | 9/1929 |
| DE | 501181 | | 7/1930 |
| DE | 523047 | | 4/1931 |
| DE | 568508 | | 1/1933 |
| DE | 572030 | | 3/1933 |
| DE | 584639 | | 9/1933 |
| DE | 586121 | | 10/1933 |
| DE | 604972 | | 11/1934 |
| DE | 629301 | | 4/1936 |
| DE | 673545 | | 3/1939 |
| DE | 719009 | | 3/1942 |
| DE | 846583 | | 8/1952 |
| DE | 875227 | | 4/1953 |
| DE | 975999 | | 1/1963 |
| DE | 1465719 | | 5/1969 |
| DE | 1807391 | | 5/1970 |
| DE | 2050674 | | 5/1971 |
| DE | 1638176 | | 6/1971 |
| DE | 2155371 | | 5/1973 |
| DE | 2400698 | | 7/1975 |
| DE | 2520511 | | 11/1976 |
| DE | 2656389 | | 6/1978 |
| DE | 2721905 | | 11/1978 |
| DE | 137164 | | 8/1979 |
| DE | 138840 | | 11/1979 |
| DE | 2824951 | | 12/1979 |
| DE | 2835386 | | 2/1980 |
| DE | 2839517 | | 3/1980 |
| DE | 2854520 | | 6/1980 |
| DE | 3009102 | | 9/1980 |
| DE | 2913697 | | 10/1980 |
| DE | 2920478 | | 12/1980 |
| DE | 3028777 | | 3/1981 |
| DE | 2939004 | | 4/1981 |
| DE | 3006382 | | 8/1981 |
| DE | 3008818 | | 9/1981 |
| DE | 209313 | | 4/1984 |
| DE | 3305225 | | 8/1984 |
| DE | 3309051 | | 9/1984 |
| DE | 3441311 | | 5/1986 |
| DE | 3543106 | | 6/1987 |
| DE | 2917717 | | 8/1987 |
| DE | 3612112 | | 10/1987 |
| DE | 3726346 | | 2/1989 |
| DE | 3925337 | | 2/1991 |
| DE | 4023903 | | 11/1991 |
| DE | 4022476 | | 1/1992 |
| DE | 4233558 | | 3/1994 |
| DE | 4402184 | | 8/1995 |
| DE | 4409794 | | 8/1995 |
| DE | 4412761 | | 10/1995 |
| DE | 4420322 | | 12/1995 |
| DE | 19620906 | | 1/1996 |
| DE | 4438186 | | 5/1996 |
| DE | 19020222 | | 3/1997 |
| DE | 19547229 | | 6/1997 |
| DE | 468827 | | 7/1997 |
| DE | 134022 | | 12/2001 |
| EP | 049104 | | 4/1982 |
| EP | 0493704 | | 4/1982 |
| EP | 0056580 | A1 | 7/1982 |
| EP | 078908 | | 5/1983 |
| EP | 0120154 | | 10/1984 |
| EP | 0130124 | | 1/1985 |
| EP | 0142813 | | 5/1985 |
| EP | 0155405 | | 9/1985 |
| EP | 0102513 | | 1/1986 |
| EP | 0174783 | | 3/1986 |
| EP | 0185788 | | 7/1986 |
| EP | 0277358 | | 8/1986 |
| EP | 0234521 | | 9/1987 |
| EP | 0244069 | | 11/1987 |
| EP | 0246377 | | 11/1987 |
| EP | 0265868 | | 5/1988 |
| EP | 0274691 | | 7/1988 |
| EP | 0280759 | | 9/1988 |
| EP | 0282876 | | 9/1988 |
| EP | 0309096 | | 3/1989 |
| EP | 0314860 | | 5/1989 |
| EP | 0316911 | | 5/1989 |
| EP | 0317248 | | 5/1989 |

| | | | |
|---|---|---|---|
| EP | 0335430 | | 10/1989 |
| EP | 0342554 | | 11/1989 |
| EP | 0221404 | | 5/1990 |
| EP | 0375101 | | 6/1990 |
| EP | 0406437 | | 1/1991 |
| EP | 0439410 | | 7/1991 |
| EP | 0440865 | | 8/1991 |
| EP | 0469155 | A1 | 2/1992 |
| EP | 0490705 | | 6/1992 |
| EP | 0503817 | | 9/1992 |
| EP | 0571155 | | 11/1993 |
| EP | 0620570 | | 10/1994 |
| EP | 0620630 | | 10/1994 |
| EP | 0642027 | | 3/1995 |
| EP | 0671632 | | 9/1995 |
| EP | 0676777 | | 10/1995 |
| EP | 0677915 | | 10/1995 |
| EP | 0684679 | | 11/1995 |
| EP | 06844682 | | 11/1995 |
| EP | 0695019 | | 1/1996 |
| EP | 0732787 | | 9/1996 |
| EP | 0738034 | | 10/1996 |
| EP | 0739087 | A2 | 10/1996 |
| EP | 0740315 | | 10/1996 |
| EP | 0749190 | A2 | 12/1996 |
| EP | 0751605 | | 1/1997 |
| EP | 0739087 | A3 | 3/1997 |
| EP | 0749193 | A3 | 3/1997 |
| EP | 0780926 | | 6/1997 |
| EP | 0802542 | | 10/1997 |
| EP | 0913912 | A1 | 5/1999 |
| FR | 805544 | | 4/1936 |
| FR | 841351 | | 1/1938 |
| FR | 847899 | | 12/1938 |
| FR | 916959 | | 12/1946 |
| FR | 1011924 | | 4/1949 |
| FR | 1126975 | | 3/1955 |
| FR | 1238795 | | 7/1959 |
| FR | 2108171 | | 5/1972 |
| FR | 2251938 | | 6/1975 |
| FR | 2305879 | | 10/1976 |
| FR | 2376542 | | 7/1978 |
| FR | 2467502 | | 4/1981 |
| FR | 2481531 | | 10/1981 |
| FR | 2556146 | | 6/1985 |
| FR | 2594271 | | 8/1987 |
| FR | 2708157 | | 1/1995 |
| GB | 123906 | | 3/1919 |
| GB | 268271 | | 3/1927 |
| GB | 293861 | | 11/1928 |
| GB | 292999 | | 4/1929 |
| GB | 319313 | | 7/1929 |
| GB | 518993 | | 3/1940 |
| GB | 537609 | | 6/1941 |
| GB | 540456 | | 10/1941 |
| GB | 589071 | | 6/1947 |
| GB | 666883 | | 2/1952 |
| GB | 685416 | | 1/1953 |
| GB | 702892 | | 1/1954 |
| GB | 715226 | | 9/1954 |
| GB | 723457 | | 2/1955 |
| GB | 739962 | | 11/1955 |
| GB | 763761 | | 12/1956 |
| GB | 805721 | | 12/1958 |
| GB | 827600 | | 2/1960 |
| GB | 854728 | | 11/1960 |
| GB | 870583 | | 6/1961 |
| GB | 913386 | | 12/1962 |
| GB | 965741 | | 8/1964 |
| GB | 992249 | | 5/1965 |
| GB | 1024583 | | 3/1966 |
| GB | 1053337 | | 12/1966 |
| GB | 1059123 | | 2/1967 |
| GB | 1103098 | | 2/1968 |
| GB | 1103099 | | 2/1968 |
| GB | 1117401 | | 6/1968 |
| GB | 1135242 | | 12/1968 |
| GB | 1147049 | | 4/1969 |
| GB | 1157885 | | 7/1969 |
| GB | 1174659 | | 12/1969 |
| GB | 1236082 | | 6/1971 |
| GB | 1268770 | | 3/1972 |
| GB | 1319257 | | 6/1973 |
| GB | 1322433 | | 7/1973 |
| GB | 1340983 | | 12/1973 |
| GB | 1341050 | | 12/1973 |
| GB | 1365191 | | 8/1974 |
| GB | 1395152 | | 5/1975 |
| GB | 1424982 | | 2/1976 |
| GB | 1426594 | | 3/1976 |
| GB | 1438610 | | 6/1976 |
| GB | 1445284 | | 8/1976 |
| GB | 1479904 | | 7/1977 |
| GB | 1493163 | | 11/1977 |
| GB | 1502938 | | 3/1978 |
| GB | 1525745 | | 9/1978 |
| GB | 2000625 | | 1/1979 |
| GB | 1548633 | | 7/1979 |
| GB | 2046142 | | 11/1979 |
| GB | 2022327 | | 12/1979 |
| GB | 2025150 | | 1/1980 |
| GB | 2034101 | | 5/1980 |
| GB | 1574796 | | 9/1980 |
| GB | 2070341 | | 9/1981 |
| GB | 2070470 | | 9/1981 |
| GB | 2071433 | | 9/1981 |
| GB | 2081523 | | 2/1982 |
| GB | 2099635 | | 12/1982 |
| GB | 2105925 | | 3/1983 |
| GB | 2106306 | | 4/1983 |
| GB | 2106721 | | 4/1983 |
| GB | 2136214 | | 9/1984 |
| GB | 2140195 | | 11/1984 |
| GB | 2150153 | | 6/1985 |
| GB | 2268337 | | 1/1994 |
| GB | 2273819 | | 6/1994 |
| GB | 2283133 | | 4/1995 |
| GB | 2289992 | | 12/1995 |
| GB | 2308490 | | 6/1997 |
| GB | 2332557 | | 6/1999 |
| HU | 175494 | | 11/1981 |
| JP | 60206121 | | 3/1959 |
| JP | 57043529 | | 8/1980 |
| JP | 57126117 | | 5/1982 |
| JP | 59076156 | | 10/1982 |
| JP | 59159642 | | 2/1983 |
| JP | 6264964 | | 9/1985 |
| JP | 1129737 | | 5/1989 |
| JP | 62320631 | | 6/1989 |
| JP | 2017474 | | 1/1990 |
| JP | 3245748 | | 2/1990 |
| JP | 4179107 | | 11/1990 |
| JP | 318253 | | 1/1991 |
| JP | 424909 | | 1/1992 |
| JP | 5290947 | | 4/1992 |
| JP | 6196343 | | 12/1992 |
| JP | 6233442 | | 2/1993 |
| JP | 6325629 | | 5/1993 |
| JP | 7057951 | | 8/1993 |
| JP | 7264789 | | 3/1994 |
| JP | 8167332 | | 12/1994 |
| JP | 7161270 | | 6/1995 |
| JP | 8264039 | | 11/1995 |
| JP | 9200989 | | 1/1996 |
| JP | 8036952 | | 2/1996 |
| JP | 8167360 | | 6/1996 |

| | | |
|---|---|---|
| LU | 67199 | 3/1972 |
| SE | 90308 | 9/1937 |
| SE | 305899 | 11/1968 |
| SE | 255156 | 2/1969 |
| SE | 341428 | 12/1971 |
| SE | 453236 | 1/1982 |
| SE | 457792 | 6/1987 |
| SE | 502417 | 12/1993 |
| SU | 792302 | 1/1971 |
| SU | 425268 | 9/1974 |
| SU | 1019553 | 1/1980 |
| SU | 694939 | 1/1982 |
| SU | 955369 | 8/1983 |
| SU | 1511810 | 5/1987 |
| WO | WO8202617 | 8/1982 |
| WO | WO8502302 | 5/1985 |
| WO | WO9011389 | 10/1990 |
| WO | WO9012409 | 10/1990 |
| WO | PCT/DE 90/00279 | 11/1990 |
| WO | WO9101059 | 1/1991 |
| WO | WO9101585 | 2/1991 |
| WO | WO9107807 | 3/1991 |
| WO | PCT SE 91/00077 | 4/1991 |
| WO | WO9109442 | 6/1991 |
| WO | WO 91/11841 | 8/1991 |
| WO | WO 91/15755 | 10/1991 |
| WO | WO8115862 | 10/1991 |
| WO | WO9201328 | 1/1992 |
| WO | WO9203870 | 3/1992 |
| WO | WO9321681 | 10/1993 |
| WO | WO9406194 | 3/1994 |
| WO | WO9518058 | 7/1995 |
| WO | WO9522153 | 8/1995 |
| WO | WO9524049 | 9/1995 |
| WO | WO9622606 | 7/1996 |
| WO | WO9622607 | 7/1996 |
| WO | PCT/CN 96/00010 | 10/1996 |
| WO | WO9630144 | 10/1996 |
| WO | WO9710640 | 3/1997 |
| WO | WO9711831 | 4/1997 |
| WO | WO9716881 | 5/1997 |
| WO | WO 97/29494 | 8/1997 |
| WO | WO9745288 | 12/1997 |
| WO | WO9745847 | 12/1997 |
| WO | WO9745848 | 12/1997 |
| WO | WO9745906 | 12/1997 |
| WO | WO9745907 | 12/1997 |
| WO | WO 9745908 | 12/1997 |
| WO | WO9745912 | 12/1997 |
| WO | WO9745914 | 12/1997 |
| WO | WO9745915 | 12/1997 |
| WO | WO9745916 | 12/1997 |
| WO | WO9745918 | 12/1997 |
| WO | WO9745919 | 12/1997 |
| WO | WO9745920 | 12/1997 |
| WO | WO9745921 | 12/1997 |
| WO | WO9745922 | 12/1997 |
| WO | WO9745923 | 12/1997 |
| WO | WO9745924 | 12/1997 |
| WO | WO9745925 | 12/1997 |
| WO | WO9745926 | 12/1997 |
| WO | WO9745927 | 12/1997 |
| WO | WO9745928 | 12/1997 |
| WO | WO9745929 | 12/1997 |
| WO | WO9745930 | 12/1997 |
| WO | WO9745931 | 12/1997 |
| WO | WO9745932 | 12/1997 |
| WO | WO9745933 | 12/1997 |
| WO | WO9745934 | 12/1997 |
| WO | WO9745935 | 12/1997 |
| WO | WO9745936 | 12/1997 |
| WO | WO9745937 | 12/1997 |
| WO | WO9745938 | 12/1997 |

| | | |
|---|---|---|
| WO | WO9745939 | 12/1997 |
| WO | WO9747067 | 12/1997 |
| WO | WO 98/20598 | 5/1998 |
| WO | WO 98/20602 | 5/1998 |
| WO | WO9820595 | 5/1998 |
| WO | WO9820596 | 5/1998 |
| WO | WO9820597 | 5/1998 |
| WO | WO9820600 | 5/1998 |
| WO | WO9821385 | 5/1998 |
| WO | PCT/FR 98/00468 | 6/1998 |
| WO | WO9827634 | 6/1998 |
| WO | WO9827635 | 6/1998 |
| WO | WO9827636 | 6/1998 |
| WO | WO9829927 | 7/1998 |
| WO | WO9829928 | 7/1998 |
| WO | WO9829929 | 7/1998 |
| WO | WO9829930 | 7/1998 |
| WO | WO9829931 | 7/1998 |
| WO | WO9829932 | 7/1998 |
| WO | WO 98/34239 | 8/1998 |
| WO | WO9833731 | 8/1998 |
| WO | WO9833736 | 8/1998 |
| WO | WO9833737 | 8/1998 |
| WO | WO9834238 | 8/1998 |
| WO | WO9834240 | 8/1998 |
| WO | WO9834241 | 8/1998 |
| WO | WO9834242 | 8/1998 |
| WO | WO9834243 | 8/1998 |
| WO | WO9834244 | 8/1998 |
| WO | WO9834245 | 8/1998 |
| WO | WO9834246 | 8/1998 |
| WO | WO9834247 | 8/1998 |
| WO | WO9834248 | 8/1998 |
| WO | WO9834249 | 8/1998 |
| WO | WO9834250 | 8/1998 |
| WO | WO9834309 | 8/1998 |
| WO | WO9834312 | 8/1998 |
| WO | WO9834315 | 8/1998 |
| WO | WO9834321 | 8/1998 |
| WO | WO9834322 | 8/1998 |
| WO | WO9834323 | 8/1998 |
| WO | WO9834325 | 8/1998 |
| WO | WO9834326 | 8/1998 |
| WO | WO9834327 | 8/1998 |
| WO | WO9834328 | 8/1998 |
| WO | WO9834329 | 8/1998 |
| WO | WO9834330 | 8/1998 |
| WO | WO9834331 | 8/1998 |
| WO | WO 98/40627 | 9/1998 |
| WO | WO 98/43336 | 10/1998 |
| WO | WO9917309 | 4/1999 |
| WO | WO9917311 | 4/1999 |
| WO | WO9917312 | 4/1999 |
| WO | WO9917313 | 4/1999 |
| WO | WO9917314 | 4/1999 |
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO 99/28922 | 6/1999 |
| WO | WO 99/29005 | 6/1999 |
| WO | WO 99/29023 | 6/1999 |

| | | |
|---|---|---|
| WO | WO 99/29025 | 6/1999 |
| WO | WO9927546 | 6/1999 |
| WO | WO9928919 | 6/1999 |
| WO | WO9928921 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO9929024 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp. 255-257, no month.

36-Kv. Generators Arise frm Insulation Research; P. Sidler; *Electrical World* Oct. 15, 1932, ppp 524.

Oil Water cooled 300 MW turbine generator;L.P. Gnedin et al;*Elektrotechnika* ,1970, pp. 6-8, no month.

J&P Transformer Book 11th Edition;A. C. Franklin et al; owned by Butterworth—Heinemann Ltd, Oxford Printed by Hartnolls Ltd in Great Britain 1983, pp. 29-67, no month.

Transformerboard; H.P. Moser et al; 1979, pp. 1-19, no month.

The Skagerrak transmission—the world's longest HVDC submarine cable link; L. Haglof et al of ASEA; ASEA Journal vol. 53, No. 1-2, 1980, pp. 3-12, no month.

Direct Connection of Generators to HVDC Converters: Main Characteristics and Comparative Advantages; J.Arrillaga et al; *Electra* No. 149, Aug. 1993, pp. 19-37.

Our flexible friend article; M. Judge; *New Scientist*, May 10, 1997, pp. 44-48.

In-Service Performance of HVDC Converter transformers and oil-cooled smoothing reactors; G.L. Desilets et al; *Electra* No. 155, Aug. 1994, pp. 7-29.

Transformateurs a courant continu haute tension-examen des specifications; A. Lindroth et al; *Electra* No. 141, Apr. 1992, pp. 34-39.

Development of a Termination for the 77 kV-Class High Tc Superconducting Power Cable; T. Shimonosono et al; IEEE Power Delivery, vol. 12, No. 1, Jan. 1997, pp. 33-38.

Verification of Limiter Performance in Modern Excitation Control Systems; G. K. Girgis et al; IEEE Energy Conservation, vol. 10, No. 3, Sep. 1995, pp. 538-542.

A High Initial response Brushless Excitation System; T. L. Dillman et al; IEEE Power Generation Winter Meeting Proceedings, Jan. 31, 1971, pp. 2089-2094.

Design, manufacturing and cold test of a superconducting coil and its cryostat for SMES applications; A. Bautista et al; IEEE Applied Superconductivity, vol. 7, No. 2, Jun. 1997, pp. 853-856.

Quench Protection and Stagnant Normal Zones in a Large Cryostable SMES; Y. Lvovsky et al; IEEE Applied Superconductivity, vol. 7, No. 2, Jun. 1997, pp. 857-860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp. 840-843.

High Speed Synchronous Motors Adjustable Speed Drives; ASEA Generation Pamphlet OG 135-101 E, Jan. 1985, pp. 1-4.

Billig burk motar overtonen; A. Felldin; *ERA* (TEKNIK) Aug. 1994, pp. 26-28.

400-kV XLPE cable system passes CIGRE test; ABB Article; ABB Review Sep. 1995, pp. 38.

FREQSYN—a new drive system for high power applications;J-A. Bergman et al; ASEA Journal 59, Apr. 1986, pp. 16-19.

Canadians Create Conductive Concrete; J. Beaudoin et al; *Science*, vol. 276, May 23, 1997, pp. 1201.

Fully Water-Cooled 190 MVA Generators in the Tonstad Hydroelectric Power Station; E. Ostby et al; BBC Review Aug. 1969, pp. 380-385.

Relocatable static var compensators help control unbundled power flows; R. C. Knight et al; *Transmission & Distribution*, Dec. 1996, pp. 49-54.

Investigation and Use of Asynchronized Machines in Power Systems*; N.I.Blotskii et al; *Elektrichestvo*, No. 12, 1-6, 1985, pp. 90-99, no month.

Variable-speed switched reluctance motors; P.J. Lawrenson et al; IEE proc, vol. 127, Pt.B, No. 4, Jul. 1980, pp. 253-265.

Das Einphasenwechselstromsystem hoherer Frequenz; J.G. Heft; Elektrische Bahnen eb; Dec. 1987, pp. 388-389.

Power Transmission by Direct Current;E. Uhlmann;ISBN 3-540-07122-9 Springer-Verlag, Berlin/Heidelberg/New York; 1975, pp. 327-328, no month.

Elektriska Maskiner; F. Gustavson; Institute for Elkreafteknilk, KTH; Stockholm, 1996, pp. 3-6-3-12, no month.

Die Wechselstromtechnik; A. Cour' Springer Verlag, Germany; 1936, pp. 586-598, no month.

Insulation systems for superconducting transmission cables; O. Toennesen; Nordic Insulation Symposium, Bergen, 1996, pp. 425-432, no month.

MPTC: An economical alternative to universal power flow controllers;N. Mohan; EPE 1997, Trondheim, pp. 3.1027-3.1030, no month.

Lexikon der Technik; Luger; Band 2, Grundlagen der Elektrotechnik und Kerntechnik, 1960, pp. 395, no month.

Das Handbuch der Lokomotiven (hungarian locomotive V40 1'D'); B. Hollingsworth et al; Pawlak Verlagsgesellschaft; 1933, pp. 254-255, no month.

Synchronous machines with single or double 3-phase star-connected winding fed by 12-pulse load commutated inverter. Simulation of operational behaviour; C. Ivarson et al; ICEM 1994, International Conference on electrical machines, vol. 1, pp. 267-272, no month.

Elkrafthandboken, Elmaskiner; A. Rejminger; Elkrafthandboken, Elmaskiner 1996, 15-20, no month.

Power Electronics—in Theory and Practice; K. Thorborg; ISBN 0-86238-341-2, 1993, pp. 1-13, no month.
Regulating transformers in power systems—new concepts and applications; E. Wirth et al; ABB Review Apr. 1997, p. 12-20.
Tranforming transformers; S. Mehta et al; *IEEE Spectrum*, Jul. 1997, pp. 43-49.
A study of equipment sizes and constraints for a unified power flow controller; J. Bian et al; IEEE Transactions on Power Delivery, vol. 12, No. 3, Jul. 1997, pp. 1385-1391.
Industrial High Voltage; F.H. Kreugrer; *Industrial High Voltage* 1991 vol. I, pp. 113-117, no month.
Hochspannungstechnik; A. Küchler; Hochspannungstechnik, VDI Verlag 1996, pp. 365-366, ISBN 3-18-401530-0 or 3-540-62070-2, no month.
High Voltage Engineering; N.S. Naidu; High Voltage Engineering ,second edition 1995 ISBN 0-07-462286-2, chapter 5, pp. 91-98, no month.
Performance Characteristics of a Wide Range Induction Type Frequency Converter; G.A. Ghoneem; Ieema.Journal, Sep. 1995, pp. 21-34.
International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1-65, no month.
Design and manufacture of a large superconducting homopolar motor; A.D. Appleton; IEEE Transactions on Magnetics, vol. 19,No. 3, Part 2, May 1983, pp. 1048-1050.
Application of high temperature superconductivy to electric motor design; J.S. Edmonds et al; IEEE Transactions on Energy Conversion Jun. 1992, No. 2, pp. 322-329.
Power Electronics and Variable Frequency Drives; B. Bimal; IEEE industrial Electronics—Technology and Applications, 1996, pp. 356, no month.
Properties of High Plymer Cement Mortar; M. Tamai et al; *Science & Technology in Japan, No. 63* ; 1977, pp. 6-14, no month.
Weatherability of Polymer-Modified Mortars after Ten-Year Outdoor Exposure in Koriyama and Sapporo; Y. Ohama et al; *Science & Technology in Japan No. 63*; 1977, pp. 26-31, no month.
SMC Powders Open New Magnetic Applications; M. Persson (Editor); *SMC Update* ,vol. 1, No. 1, Apr. 1997.
Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882-1888.
Low-intensy laser-triggering of rail-gaps with magnesium-aerosol switching-gases; W. Frey; 11th International Pulse Power Conference, 1997, Baltimore, USA Digest of Technical Papers, p. 322-327, no month.
Shipboard Electrical Insulation; G. L. Moses, 1951, pp. 2&3, no month.
ABB Elkrafthandbok; ABB AB; 1988; pp. 274-276, no month.
Elkraft teknisk Handbok, 2 Elmaskiner; A. Alfredsson et al; 1988, pp. 121-123, no month.
High Voltage Cables in a New Class of Generators Powerformer; M. Leijon et al; Jun. 14, 1999; pp. 1-8.
Ohne Tranformator direkt ins Netz; Owman et al, ABB, AB; Feb. 8, 1999; pp. 48-51.
Submersible Motors and Wet-Rotor Motors for Centrifugal Pumps Submerged in the Fluid Handled; K.. Bienick, KSB; Feb. 25, 1988; pp. 9-17.
High Voltage Generators; G. Beschastnov et al; 1977; vol. 48. No. 6 pp. 1-7, no month.
Eine neue Type von Unterwassermotoren; Electrotechnik und Maschinenbam, 49; Aug. 1931; pp. 2-3.
Problems in design of the 110-5OokV high-voltage generators; Nikiti et al; World Electrotechnical Congress; Jun. 21-27, 1977; Section 1. Paper #18.
Manufacture and Testing of Roebel bars; P. Marti et al; 1960, Pub.86, vol. 8, pp. 25-31, no month.
Hydroalternators of 110 to 220 kV Elektrotechn. Obz., vol. 64, No. 3, pp. 132-136 Mar. 1975; A. Abramov.
Design Concepts for an Amorphous Metal Distribution Transformer; E. Boyd et al; IEEE Nov. 1984.
Neue Wege zum Bau zweipoliger Turbogeneratoren bis 2 GVA, 60kV Elektrotechnik und Maschinenbau Wien Janner 1972, Heft 1, Seite 1-11; G. Aichholzer, no month.
Optimizing designs of water-resistant magnet wire; V. Kuzenev et al; Elektrotekhnika, vol. 59, No. 12, pp. 35-40, 1988, no month.
Zur Entwicklung der Tauchpumpenmotoren; A. Schanz; KSB, pp. 19-24, no date.
Direct Generation of alternating current at high voltages; R. Parsons; IEEE Journal, vol. 67 #393, Jan. 15, 1929; pp. 1065-1080.
Stopfbachslose Umwalzpumpen- ein wichtiges Element im modernen Kraftwerkbau; H. Holz, KSB 1, pp. 13-19, 1960, no month.
Zur Geschichte der Brown Boveri-Synchron-Maschinen; Vierzig Jahre Generatorbau; Jan.-Feb. 1931 pp. 15-39.
Technik und Anwendung moderner Tauchpumpen; A. Heumann; 1987, no month.
High capacity synchronous generator having no tooth stator; V.S. Kildishev et al; No. 1, 1977 pp. 11-16, no month.
Der Asynchronmotor als Antrieb stopfbcichsloser Pumpen; E. Picmaus; Electrotechnik und Maschinenbay No. 78, pp. 153-155, 1961, no month.
Low core loss rotating flux transformer; R. F. Krause, et al; American Institute Physics J.Appl.Phys vol. 64 #10 Nov. 1988, pp. 5376-5378.
An EHV bulk Power transmission line Made with Low Loss XLPE Cable;Ichihara et al; Aug. 1992; pp. 3-6.
Underground Transmission Systems Reference Book; 1992;pp. 16-19; pp. 36-45; pp. 67-81, no month.
Power System Stability and Control; P. Kundur, 1994; pp. 23-25;p. 767, no month.
Six phase Synchronous Machine with AC and DC Stator Connections, Part II:Harmonic Studies and a proposed Uninterruptible Power Supply Scheme; R. Schiferl et al.;Aug. 1983 pp. 2694-2701.
Six phase Synchronous Machine with AC and DC Stator Connections, Part 1: Equivalent circuit representation and Steady-State Analysis; R. Schiferl et al; Aug. 1983; pp. 2685-2693.
Reactive Power Compensation; T. Petersson; 1993; pp. 1-23, no month.
Permanent Magnet Machines; K. Binns; 1987; pp. 9-1 through 9-26, no month.
Hochspannungsaniagen for Wechselstrom; 97. Hochspannungsaufgaberl an Generatoren und Motoren; Roth et al; 1938; pp. 452-455, no month.
Hochspannungsanlagen for Wechselstrom; 97. Hochspannungsaufgaben an Generatoren und Motoren; Roth et al; Spring 1959, pp. 30-33, no month.
Neue Lbsungswege zum Entwurf grosser Turbogeneratoren bis 2GVA, 6OkV; G. Aicholzer; Sep. 1974, pp. 249-255.

Advanced Turbine-generators- an assessment; A. Appleton, et al; International Conf. Proceedings, Lg HV Elec. Sys. Paris, FR, Aug.-Sep. 1976, vol. I, Section 11-02, p. 1-9.
Fully slotless turbogenerators; E. Spooner; Proc., IEEE vol. 120 #12, Dec. 1973.
Toroidal winding geometry for high voltage superconducting alternators; J. Kirtley et al; MIT—Elec. Power Sys. Engrg. Lab for IEEE PES;Feb. 1974.
High-Voltage Stator Winding Development; D. Albright et al; Proj. Report EL339, Project 1716, Apr. 1984.
POWERFORMER™: A giant step in power plant engineering; Owman et al; CIGRE 1998, Paper 11:1.1, no month.
Thin Type DC/DC Converter using a coreless wire transformer; K. Onda et al; Proc. IEEE Power Electronics Spec. Conf.; Jun. 1994, pp. 330-334.
Development of extruded polymer insulated superconducting cable; Jan. 1992.
Transformer core losses; B. Richardson; Proc. IEEE May 1986, pp. 365-368.
Cloth-transformer with divided windings and tension annealed amorphous wire; T. Yammamoto et al; IEEE Translation Journal on Magnetics in Japan vol. 4, No. 9 Sep. 1989.
A study of equipment sizes and constraints for a unified power flow controller; J Bian et al; IEEE 1996, no month.

POWER TRANSFORMER/INDUCTOR

CROSS REFERENCE TO RELATED APPLICATION

This application is a continuation of application Ser. No. 09/355,795, filed Oct. 22, 1999.

BACKGROUND OF THE INVENTION

1. Field of the Invention

The present invention relates to a power transformer/inductor.

In all transmission and distribution of electric energy, transformers are used for enabling exchange between two or more electric systems normally having different voltage levels. Transformers are available for powers from the VA region to the 1000 MVA region. The voltage range has a spectrum of up to the highest transmission voltages used today. Electromagnetic induction is used for energy transmission between electric systems.

Inductors are also an essential component in the transmission of electric energy in for example phase compensation and filtering.

The transformer/inductor related to the present invention belongs to the so-called power transformers/inductors having rated outputs from several hundred kVA to in excess of 1000 MVA and rated voltages of from 3–4 kV to very high transmission voltages.

2. Discussion of the Background

Generally speaking the main object of a power transformer is to enable the exchange of electric energy, between two or more electric systems of mostly differing voltages with the same frequency. Conventional power transformers/inductors are e.g. described in the book "Elektriska Maskiner" by Fredrik Gustavson, page 3-6-3-12, published by The Royal Institute of Technology, Sweden, 1996.

A conventional power transformer/inductor includes a transformer core, referred to below as a core, formed of laminated commonly oriented sheet, normally of silicon iron. The core is composed of a number of core legs connected by yokes. A number of windings are provided around the core legs normally referred to as primary, secondary and regulating winding. In power transformers these windings are practically always arranged in concentric configuration and distributed along the length of the core leg.

Other types of core structures occasionally occur in e.g. so-called shell transformers or in ring-core transformers. Examples related to core constructions are discussed in DE 40414. The core may be made of conventional magnetizable materials such as said oriented sheet and other magnetizable materials such as ferrites, amorphous material, wire strands or metal tape. The magnetizable core is, as known, not necessary in inductors.

The above-mentioned windings constitute one or several coils connected in series, the coils of which having a number of turns connected in series. The turns of a single coil normally make up a geometric, continuous unit which is physically separated from the remaining coils.

A conductor is known through U.S. Pat. No. 5,036,165, in which the insulation is provided with an inner and an outer layer of semiconducting pyrolized glassfiber. It is also known to provide conductors in a dynamo-electric machine with such an insulation, as described in U.S. Pat. No. 5,066,881 for instance, where a semiconducting pyrolized glassfiber layer is in contact with the two parallel rods forming the conductor, and the insulation in the stator slots is surrounded by an outer layer of semiconducting pyrolized glassfiber. The pyrolized glassfiber material is described as suitable since it retains its resistivity even after the impregnation treatment.

The insulation system, partly on the inside of a coil winding and partly between coils/windings and remaining metal parts, is normally in the form of a solid- or varnish based insulation and the insulation system on the outside is in the form of a solid cellulose insulation, fluid insulation, and possibly also an insulation in the form of gas. Windings with insulation and possible bulky parts represent in this way large volumes that will be subjected to high electric field strengths occurring in and around the active electric magnetic parts belonging to transformers. A detailed knowledge of the properties of insulation material is required in order to predetermine the dielectric field strengths which arise and to attain a dimensioning such that there is a minimal risk of electrical discharge. It is important to achieve a surrounding environment which does not change or reduce the insulation properties.

Today's predominant outer insulation system for conventional high voltage power transformers/inductors include cellulose material as the solid insulation and transformer oil as the fluid insulation. Transformer oil is based on so-called mineral oil.

Conventional insulation systems are e.g. described in the book "Elektriska Maskiner" by Fredrik Gustavson, page 3-9-3-11, published by The Royal Institute of Technology, Sweden, 1996.

Additionally, a conventional insulation system is relatively complicated to construct and special measures need to be taken during manufacture in order to utilize good insulation properties of the insulation system. The system must have a low moisture content and the solid phase in the insulation system needs to be well impregnated with the surrounding oil so that there is minimal risk of gas pockets. During manufacture a special drying process is carried out on the complete core with windings before it is lowered into the tank. After lowering the core and sealing the tank, the tank is emptied of all air by a special vacuum treatment before being filled with oil. This process is relatively time-consuming seen from the entire manufacturing process in addition to the extensive utilization of resources in the workshop.

The tank surrounding the transformer must be constructed in such a way that it is able to withstand full vacuum since the process requires that all the gas be pumped out to almost absolute vacuum which involves extra material consumption and manufacturing time.

Furthermore the installation requires vacuum treatment to be repeated each time the transformer is opened for inspection.

SUMMARY OF THE INVENTION

According to the present invention the power transformer/inductor includes at least one winding in most cases arranged around a magnetizable core which may be of different geometries. The term "windings" will be referred to below in order to simplify the following specification. The windings are composed of a high voltage cable with solid insulation. The cables have at least one centrally situated electric conductor. Around the conductor there is arranged a first semiconducting layer, around the semiconducting layer there is arranged a solid insulating layer and around the solid insulating layer there is arranged a second external semiconducting layer.

The use of such a cable implies that those regions of a transformer/inductor which are subjected to high electric stress are confined to the solid insulation of the cable. Remaining parts of the transformer/inductor, with respect to high voltage, are only subjected to very moderate electric field strengths. Furthermore, the use of such a cable eliminates several problem areas described under the background of the invention. Consequently a tank is not needed for insulation and coolant. The insulation as a whole also becomes substantially simple. The time of construction is considerably shorter compared to that of a conventional power transformer/inductor. The windings may be manufactured separately and the power transformer/inductor may be assembled on site.

However, the use of such a cable presents new problems which must be solved. The semiconducting outer layer must be directly earthed at or in the vicinity of both ends of the cable so that the electric stress which arises, both during normal operating voltage and during transient progress, will primarily load only the solid insulation of the cable. The semiconducting layer and these direct earthings form together a closed circuit in which a current is induced during operation. The resistivity of the layer must be large enough so that resistive losses arising in the layer are negligible.

Besides this magnetic induced current a capacitive current is to flow into the layer through both directly earthed ends of the cable. If the resistivity of the layer is too high, the capacitive current will become so limited that the potential in parts of the layer, during a period of alternating stress, may differ to such an extent from earth potential that regions of the power transformer/inductor other than the solid insulation of the windings will be subjected to electric stress. By directly earthing several points of the semiconducting layer, preferably one point per turn of the winding, the whole outer layer will remain at earth potential and the elimination of the above-mentioned problems is ensured if the conductivity of the layer is high enough.

This one point earthing per turn of the outer screen is performed in such a way that the earth points rest on a generatrix to a winding and that points along the axial length of the winding are electrically directly connected to a conducting earth track which is connected thereafter to the common earth potential.

In extreme cases the windings may be subjected to such rapid transient overvoltage that parts of the outer semiconducting layer carry such a potential that areas of the power transformer other than the insulation of the cable are subjected to undesirable electric stress. In order to prevent such a situation, a number of non-linear elements, e.g. spark gaps, phanotrons, Zener-diodes or varistors are connected in between the outer semiconducting layer and earth per turn of the winding. Also by connecting a capacitor in between the outer semiconducting layer and earth a non-desirable electric stress may be prevented from arising. A capacitor reduces the voltage even at 50 Hz. This earthing principle will be referred to below as “indirect earthing”.

In the power transformer/inductor in accordance with the present invention, the second semiconducting layer is directly earthed at both ends of each winding and is indirectly earthed at at least one point between both the ends.

The individually earthed earthing tracks are connected to earth via either, 1. a non-linear element, e.g. a spark gap or a phanotron,
2. a non-linear element parallel to a capacitor,
3. a capacitor or a combination of all three alternatives.

In a power transformer/inductor according to the invention the windings are preferably composed of cables having solid, extruded insulation, of a type now used for power distribution, such as XLPE-cables or cables with EPR-insulation. Such cables are flexible, which is an important property in this context since the technology for the device according to the invention is based primarily on winding systems in which the winding is formed from cable which is bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term “flexible” is used to indicate that the winding is flexible down to a radius of curvature in the order of four times the cable diameter, preferably eight to twelve times the cable diameter.

Windings in the present invention are constructed to retain their properties even when they are bent and when they are subjected to thermal stress during operation. It is vital that the layers of the cable retain their adhesion to each other in this context. The material properties of the layers are decisive here, particularly their elasticity and relative coefficients of thermal expansion. In a XLPE-cable, for instance, the insulating layer is made of cross-linked, low-density polyethylene, and the semiconducting layers are made of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^{6}$ ohm-cm, e.g. 1–500 ohm-cm, or 10–200 ohm-cm, naturally also fall within the scope of the invention.

The insulating layer may be made, for example, of a solid thermoplastic material such as low-density polyethylene (LOPE), high-density polyethylene (HDPE), polypropylene (PP), polybutylene (PB), polymethyl pentene (PMP), crosslinked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber, butyl graft polyethylene, ethylene-butyl-acrylate-copolymers and ethylene-ethyl-acrylate copolymers may also constitute suitable polymers for the semiconducting layers.

Even when different types of material are used as a base in the various layers, it is desirable for their coefficients of thermal expansion to be substantially the same. This is the case with combination of the materials listed above.

The materials listed above have relatively good elasticity, with an E-modulus of E<500 MPa, preferably <200 MPa.

The elasticity is sufficient for any minor differences between the coefficients of thermal expansion for the materials in the layers to be absorbed in the radial direction of the elasticity so that no cracks or other damage appear and so that the layers are not released from each other. The material in the layers is elastic, and the adhesion between the layers is at least of the same magnitude as the weakest of the materials.

The conductivity of the two semiconducting layers is sufficient to substantially equalize the potential along each layer. The conductivity of the outer semiconducting layer is sufficiently large to contain the electrical field in the cable, but sufficiently small not to give rise to significant losses due to currents induced in the longitudinal direction of the layer.

Thus, each of the two semiconducting layers essentially constitutes one equipotential surface, and these layers will substantially enclose the electrical field between them.

There is, of course, nothing to prevent one or more additional semiconducting layers being arranged in the insulating layer.

The invention will now be described in more detail in the following description of preferred embodiments with particular reference to the accompanying drawings.

DETAILED DESCRIPTION OF THE PREFERRED EMBODIMENTS

Figure 1:
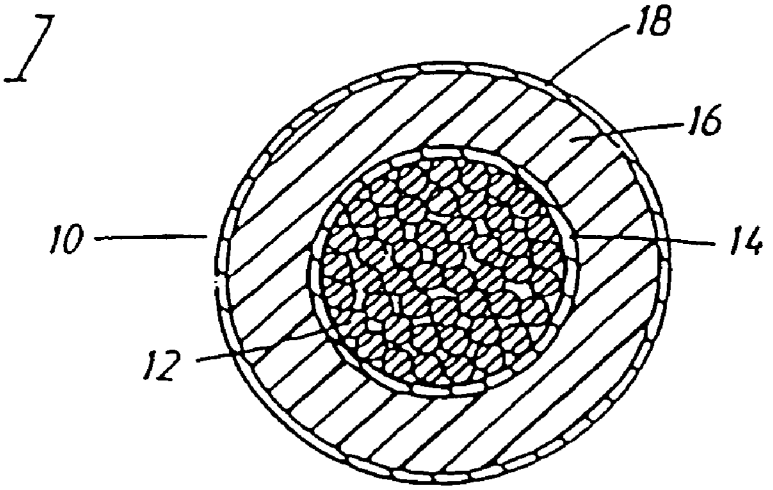
FIG. 1 shows a cross-sectional view of a high voltage cable.

FIG. 1 shows a cross-sectional view of a high voltage cable 10 which is used traditionally for the transmission of electric energy. The shown high voltage cable may for example be a standard XLPE cable 145 kV but without mantle and screen. The high voltage cable 10 includes an electric conductor, which may have one or several strands 12 with circular cross-section of for example copper (Cu). These strands 12 are arranged in the center of the high voltage cable 10. Around the strands 12 there is arranged a first semiconducting layer 14. Around the first semiconducting layer 14 there is arranged a first insulating layer 16, for example XLPE insulation. Around the first insulating 16 there is arranged a second semiconducting layer 18.

The high voltage cable 10, shown in FIG. 1 is manufactured with a conductor area of between 80 and 3000 $mm^2$ and with an outer cable diameter of between 20 and 250 mm.

Figure 2:
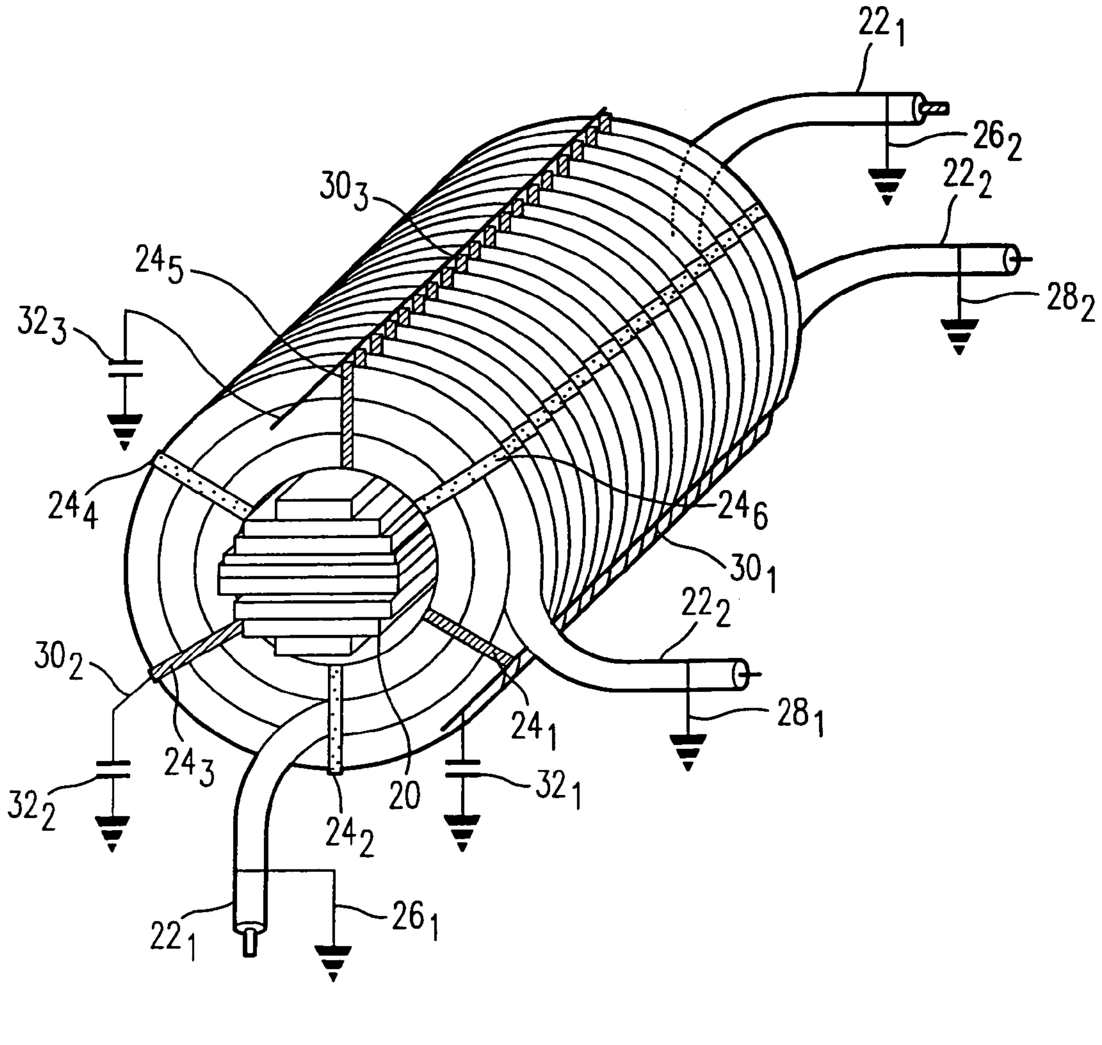
FIG. 2 shows a perspective view of windings with three indirect earthing points per winding turn according to a first embodiment of the present invention.

FIG. 2 shows a perspective view of windings with three indirect earthing points per winding turn according to a first embodiment of the present invention. FIG. 2 shows a core leg designated by the numeral 20 within a power transformer or inductor. Two windings $\mathbf{22}_1$ and $\mathbf{22}_2$ are arranged around the core leg 20 which are formed from the high-voltage cable (10) shown in FIG. 1. With the aim of fixing windings $\mathbf{22}_1$ and $\mathbf{22}_2$ there are, in this case six radially arranged spacer members $\mathbf{24}_1$, $\mathbf{24}_2$, $\mathbf{24}_3$, $\mathbf{24}_4$, $\mathbf{24}_5$, $\mathbf{24}_6$, per winding turn. As shown in FIG. 2 the outer semiconducting layer is earthed at both ends $\mathbf{26}_1$, $\mathbf{26}_2$; $\mathbf{28}_1$, $\mathbf{28}_2$ of each winding $\mathbf{22}_1$, $\mathbf{22}_2$. Spacer members $\mathbf{24}_1$, $\mathbf{24}_3$, $\mathbf{24}_5$, which are emphasized in black, are utilised to achieve, in this case, three indirect earthing points per winding turn. The spacer member $\mathbf{24}_1$ is directly connected to a first earthing element $\mathbf{30}_1$, spacer member $\mathbf{24}_3$ is directly connected to a second earthing element $\mathbf{30}_2$ and spacer member $\mathbf{24}_3$ is directly connected to a third earthing element $\mathbf{30}_3$ at the periphery of the winding $\mathbf{22}_2$ and along the axial length of the winding $\mathbf{22}_2$. Earthing elements $\mathbf{30}_1$, $\mathbf{30}_2$, $\mathbf{30}_3$ may for example be in the form of earthing tracks $\mathbf{30}_1$-$\mathbf{30}_3$. As shown in FIG. 2 the earthing points rest on a generatrix to a winding. Each and every one of the earthing elements $\mathbf{30}_1$-$\mathbf{30}_3$ is directly earthed in that they are connected to earth via their own capacitor $\mathbf{32}_1$, $\mathbf{32}_2$, $\mathbf{32}_3$. By earthing indirectly in this way any non-desirable electric stress may be prevented from arising.

Figure 3:
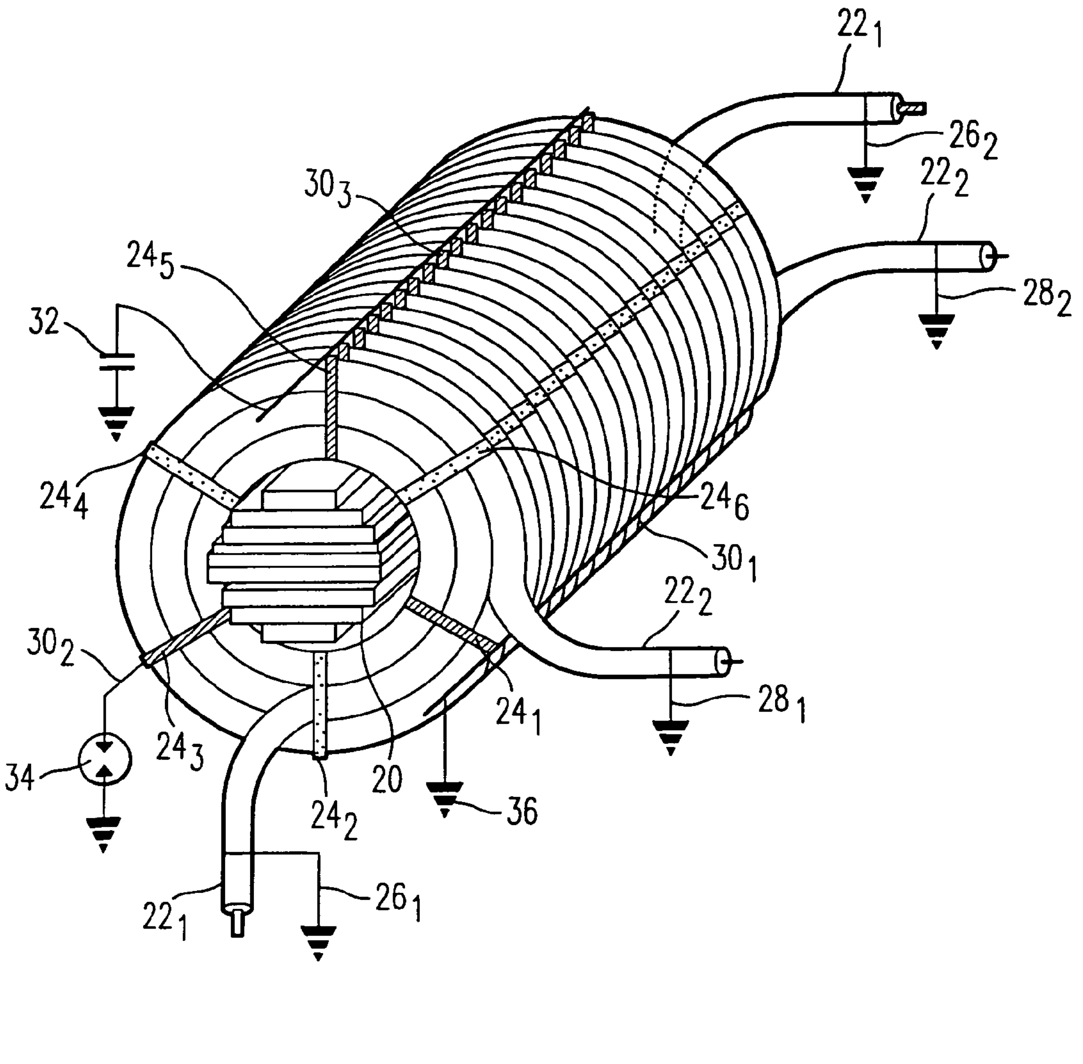
FIG. 3 shows a perspective view of windings with one direct earthing point and two indirect earthing points per winding turn according to a second embodiment of the present invention.

FIG. 3 shows a perspective view of windings with one direct earthing point and two indirect earthing points per winding turn according to a second embodiment of the present invention. In FIGS. 2 and 3 the same parts are designated by the same numerals in order to make the Figures more clear. Also in this case the two windings $\mathbf{22}_2$ and $\mathbf{22}_2$, formed from the high-voltage cable 10 shown in FIG. 1, are ranged around the core leg 20. Windings $\mathbf{22}_1$, $\mathbf{22}_2$ are fixed by means of six spacer members $\mathbf{24}_1$, $\mathbf{24}_2$, $\mathbf{24}_3$, $\mathbf{24}_4$, $\mathbf{24}_5$, $\mathbf{24}_6$ per winding turn. At both ends $\mathbf{26}_1$, $\mathbf{26}_2$; $\mathbf{28}_1$, $\mathbf{28}_2$ of each winding $\mathbf{22}_1$, $\mathbf{22}_2$ the second semiconducting layer (compare with FIG. 1) is earthed in accordance with FIG. 2. Spacer members $\mathbf{24}_1$, $\mathbf{24}_3$, $\mathbf{24}_5$, which are marked in black, are used in order to achieve in this case one direct and two indirect earthing points per winding turn. In the same way as shown in FIG. 2 spacer member $\mathbf{24}_1$ is directly connected to a first earthing element $\mathbf{30}_1$, spacer member 243 is directly connected to a second earthing element $\mathbf{30}_2$ and spacer member $\mathbf{24}_3$ is directly connected to a third earthing element $\mathbf{30}_3$. As shown in FIG. 3 earthing element $\mathbf{30}_1$ is directly connected to earth 36, while earthing elements $\mathbf{30}_2$, $\mathbf{30}_3$ are indirectly earthed. Earthing element $\mathbf{30}_3$ is indirectly earthed in that it is connected in series to earth via a capacitor 32. Earthing element $\mathbf{30}_2$ is indirectly earthed in that it is connected in series to earth via a spark gap 34. The spark gap is an example of a non-linear element, i.e. an element with a nonlinear voltage current characteristic.

Figure 4:
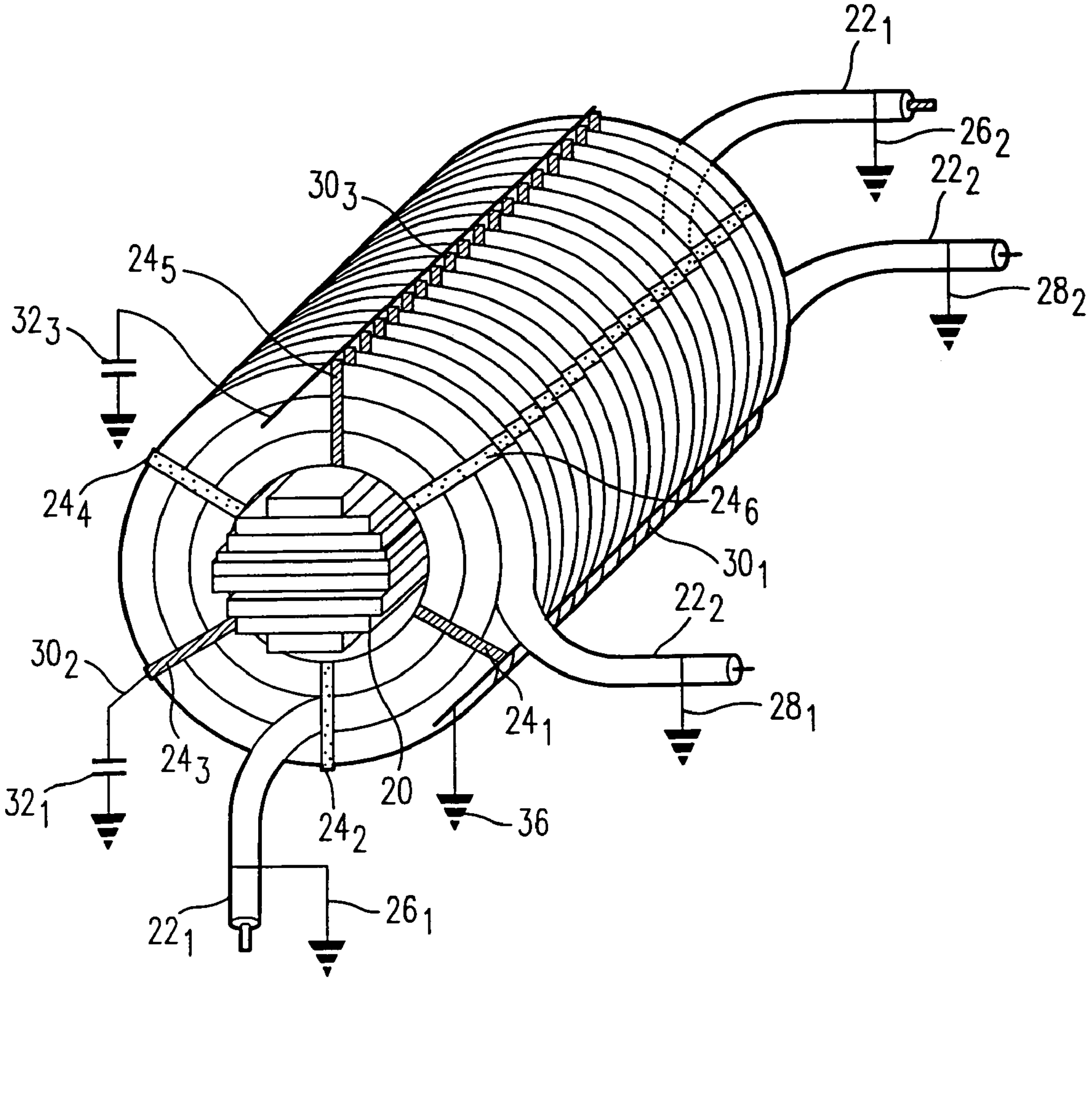
FIG. 4 shows a perspective view of windings with one direct earthing point and two indirect earthing points per winding turn according to a third embodiment of the present invention.

FIG. 4 shows a perspective view of windings with one direct earthing point and two indirect earthing points per winding turn according to a third embodiment of the present invention. In FIGS. 2–4 the same parts are designated by the same numerals in order to make the Figures more clear. FIG. 4 shows windings $\mathbf{22}_1$, $\mathbf{22}_2$, a core leg 20, spacer members $\mathbf{24}_1$, $\mathbf{24}_2$, $\mathbf{24}_3$, $\mathbf{24}_4$, $\mathbf{24}_5$, $\mathbf{24}_6$ and earthing elements $\mathbf{30}_1$, $\mathbf{30}_2$, $\mathbf{30}_3$ arranged in the same way as shown in FIG. 3 and will therefore not be described in further detail here. Earthing element $\mathbf{30}_1$ is directly connected to earth, while earthing elements $\mathbf{30}_2$, $\mathbf{30}_3$ are indirectly earthed. Earthing elements $\mathbf{30}_2$, $\mathbf{30}_3$ are indirectly earthed in that they are connected in series via their own capacitor.

Figure 5:
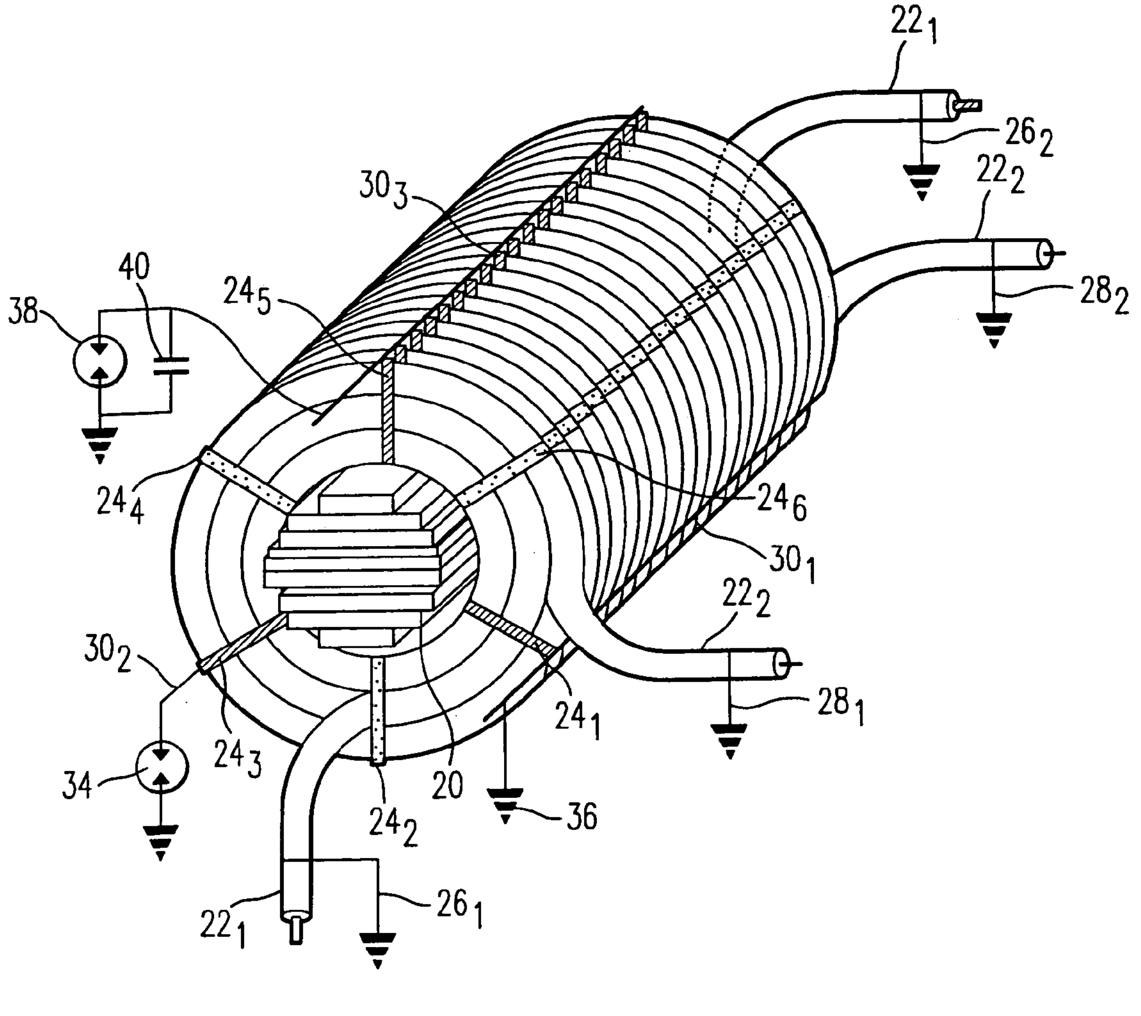
FIG. 5 shows a perspective view of windings with one direct earthing point and two indirect earthing points per winding turn according to a fourth embodiment of the present invention.

FIG. 5 shows a perspective view of windings with one direct earthing point and two indirect earthing points per winding turn according to a fourth embodiment of the present invention. In FIGS. 2–5 the same parts are designated the same numerals in order to make the Figures more clear. FIG. 5 shows windings 22$_1$, 22$_2$, a core leg 20, spacer members 24$_1$, 24$_2$, 24$_2$, 24$_4$, 24$_5$, 26$_6$, end earthing points 26$_1$, 26$_2$; 26$_1$, 28$_2$ and earthing elements 30$_1$, 30$_2$, 30$_3$ arranged in the same way as shown in FIGS. 3 and 4 and will therefore not be described in further detail here. Earthing element 30$_1$ is directly connected to earth 36, while earthing elements 30$_2$, 30$_3$ are indirectly earthed. The earthing element 30$_2$ is indirectly earthed in that it is connected in series to earth via a discharge gap. Earthing element 30$_3$ is indirectly earthed in that it is connected in series to earth via a circuit, having a spark gap 38 connected parallel to a capacitor 40.

Figure 6:
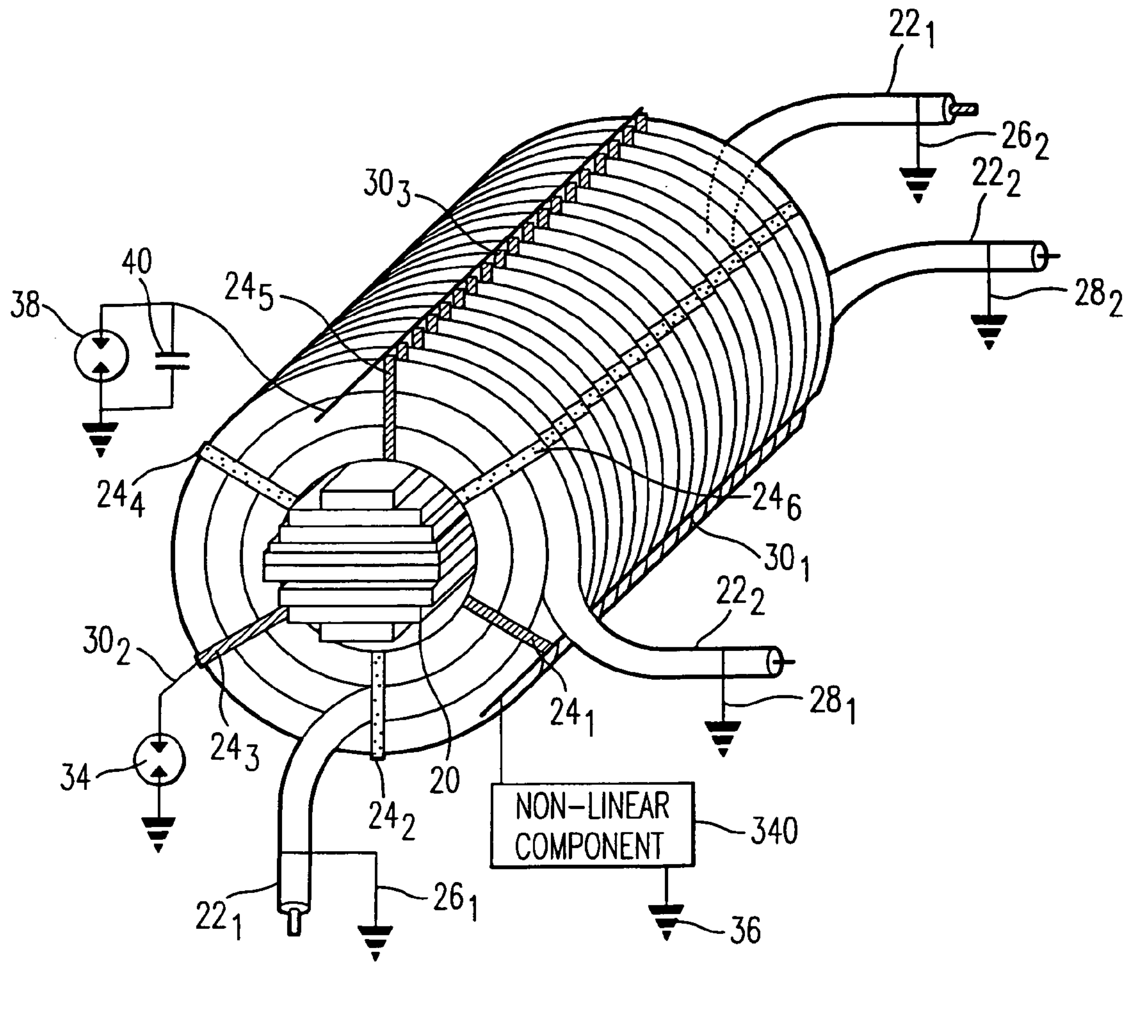
FIG. 6 is like FIG. 5, but shows the use of a non-linear component.

FIG. 6 is like FIG. 5, but shows the use of a non-linear component 340, such as a spark gap, a gas-filled diode, a Zener-diode or a varistor.

Only the spark gap in the above shown embodiments of the present invention is shown by way of example.

The power transformer/inductor in the above shown Figures includes a magnetizable core. It should however be understood that a power transformer/inductor may be built without a magnetizable core.

The invention is not limited to the shown embodiments because several variations are possible within the frame of the attached patent claims.

The invention claimed is:

1. A power transformer/inductor comprising:

a winding composed of a high-voltage cable having an electric conductor, and layers around the conductor, said layers including a first semiconducting layer, around the first semiconducting layer there is arranged an insulating layer and around the insulating layer there is arranged a second semiconducting layer, wherein the second semiconducting layer being directly earthed at both ends of the winding, but not directly earthed at an intermediate turn where the electric conductor is covered, and that at least one point between both the ends is indirectly earthed.

2. A power transformer/inductor according to claim 1, wherein:

the high-voltage cable having a conductor area in an inclusive range of 80 through 3000 mm$^2$ and an outer cable diameter in an inclusive range of 20 to 250 mm.

3. A power transformer/inductor according to claim 1, wherein:

the second semiconducting layer is directly earthed by a direct earth galvanic connection to earth.

4. A power transformer/inductor according to claim 1, wherein:

said at least one point is indirectly earthed with a capacitor inserted between earth and the second semiconducting layer.

5. A power transformer/inductor according to claim 1, wherein:

said at least one point is indirectly earthed with an element with a non-linear voltage-current characteristic inserted between the second semiconducting layer and earth.

6. A power transformer/inductor according to claim 1, wherein:

said at least one point is indirectly earthed with a circuit inserted between the second semiconducting layer and earth, the circuit including an element with a non-linear voltage-current characteristic in parallel to a capacitor.

7. A power transformer/inductor according to claim 1, wherein:

said at least one point is indirectly earthed with at least one of a capacitor, an element with a non-linear voltage-current characteristic and the capacitor in parallel with the element.

8. A power transformer/inductor according to claim 1, further comprising:

a magnetizable core about which the winding is wound.

9. A power transformer/inductor according to claim 1, wherein:

said winding does not have a magnetizable core.

* * * * *